United States Patent
Devendran et al.

(10) Patent No.: US 10,780,876 B2
(45) Date of Patent: Sep. 22, 2020

(54) METHOD AND APPARATUS FOR STORING KINETIC ENERGY WITHIN AN AUTOMATIC TRANSMISSION ACCUMULATOR

(71) Applicant: Ford Global Technologies, LLC, Dearborn, MI (US)

(72) Inventors: Ram Sudarsan Devendran, Farmington Hills, MI (US); John Edward Brevick, Livonia, MI (US); Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 528 days.

(21) Appl. No.: 15/614,738

(22) Filed: Jun. 6, 2017

(65) Prior Publication Data

US 2018/0345950 A1 Dec. 6, 2018

(51) Int. Cl.
| | |
|---|---|
| *B60W 10/184* | (2012.01) |
| *B60W 10/188* | (2012.01) |
| *B60W 10/196* | (2012.01) |
| *F16H 61/00* | (2006.01) |
| *F15B 1/033* | (2006.01) |
| *B60T 13/14* | (2006.01) |
| *B60T 1/10* | (2006.01) |

(52) U.S. Cl.
CPC ............. *B60W 10/196* (2013.01); *B60T 1/10* (2013.01); *B60T 13/14* (2013.01); *B60W 10/184* (2013.01); *B60W 10/188* (2013.01); *F15B 1/033* (2013.01); *F16H 61/0025* (2013.01); *F15B 2211/20546* (2013.01); *F15B 2211/212* (2013.01); *F15B 2211/6306* (2013.01); *F15B 2211/6313* (2013.01); *F15B 2211/665* (2013.01); *F15B 2211/6652* (2013.01); *F15B 2211/88* (2013.01); *F16H 2061/0034* (2013.01)

(58) Field of Classification Search
CPC .... B60T 1/10; B60T 13/14; F16H 2061/0034; F16H 61/0025
See application file for complete search history.

(56) References Cited

U.S. PATENT DOCUMENTS

| | | | | |
|---|---|---|---|---|
| 7,082,757 B2 * | 8/2006 | Teslak | ................... | B60K 6/12 180/165 |
| 7,146,266 B2 * | 12/2006 | Teslak | ................... | B60K 6/12 701/69 |
| 7,147,078 B2 * | 12/2006 | Teslak | ................... | B60K 6/12 180/305 |
| 7,147,239 B2 * | 12/2006 | Teslak | ................... | B60K 6/12 180/306 |

(Continued)

*Primary Examiner* — Thomas G Black
*Assistant Examiner* — Ce Li Li
(74) *Attorney, Agent, or Firm* — Vincent Mastrogiacomo; Brooks Kushman, P.C.

(57) ABSTRACT

A system for a vehicle is disclosed. The system may include an accumulator, a pump, and a controller. The controller may be configured to, responsive to braking of the vehicle, close a line pressure regulator to isolate the accumulator and pump from a transmission pressure line demand, and operate the pump to charge the accumulator without satisfying any of the demand, and responsive to a tip-in event, open the line pressure regulator and operate the accumulator and pump to satisfy the demand.

10 Claims, 3 Drawing Sheets

(56) References Cited

U.S. PATENT DOCUMENTS

| | | | | |
|---|---|---|---|---|
| 7,232,192 | B2* | 6/2007 | Teslak | B60K 6/12 |
| | | | | 180/165 |
| 7,779,628 | B2* | 8/2010 | Petre | B60K 6/12 |
| | | | | 60/413 |
| 8,302,720 | B2* | 11/2012 | Rose | B60K 6/12 |
| | | | | 180/167 |
| 8,408,144 | B2* | 4/2013 | Read | B60T 1/10 |
| | | | | 105/26.05 |
| 8,622,859 | B2 | 1/2014 | Babbitt et al. | |
| 8,968,135 | B2 | 3/2015 | Stephens et al. | |
| 9,199,647 | B2* | 12/2015 | Zhang | B60K 6/12 |
| 9,738,162 | B2* | 8/2017 | Ferri | B60W 10/188 |
| 10,363,946 | B2* | 7/2019 | Sneddon | F01B 17/022 |
| 10,493,852 | B2* | 12/2019 | Ferri | B60T 7/042 |
| 2006/0000659 | A1* | 1/2006 | Teslak | B60K 6/12 |
| | | | | 180/307 |
| 2006/0004507 | A1* | 1/2006 | Teslak | B60K 6/12 |
| | | | | 701/69 |
| 2006/0004509 | A1* | 1/2006 | Teslak | B60K 6/12 |
| | | | | 701/84 |
| 2013/0043086 | A1* | 2/2013 | Weaver | F16H 61/0021 |
| | | | | 180/165 |
| 2014/0297147 | A1* | 10/2014 | Newman | B60T 8/18 |
| | | | | 701/70 |
| 2016/0207511 | A1* | 7/2016 | Ross | B60T 8/267 |
| 2018/0209524 | A1* | 7/2018 | Dodson | B61C 9/16 |

\* cited by examiner

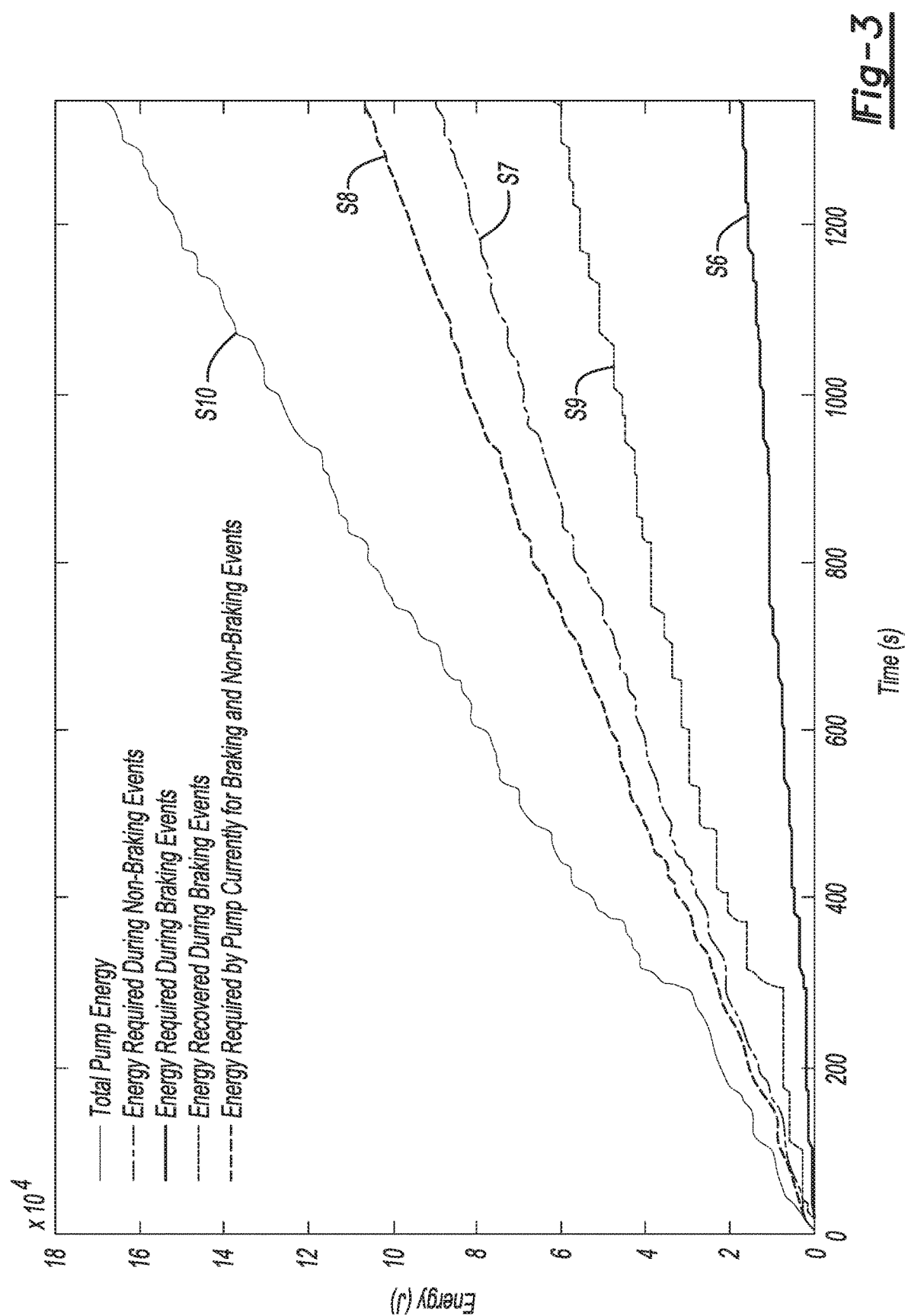

METHOD AND APPARATUS FOR STORING KINETIC ENERGY WITHIN AN AUTOMATIC TRANSMISSION ACCUMULATOR

TECHNICAL FIELD

The present disclosure relates to controlling a hydraulic circuit within an automatic transmission to capture kinetic energy.

BACKGROUND

Fuel economy and emissions performance of an automobile is an important characteristic. A higher fuel economy and lower emissions rating may make a vehicle more attractive to potential buyers and may help an automotive manufacturer meet fuel economy and emissions standards imposed by local governments. One method of reducing fuel consumption and decreasing vehicle emissions, is capturing kinetic energy generated by the moving vehicle. Capturing kinetic energy dissipated when friction brakes are applied is well known. However, these methods often involve complex and expensive components. Kinetic energy may also be present and lost within an automatic transmission. Automatic transmissions may utilize pressurized hydraulic fluid to power the various hydraulic components within the transmission.

SUMMARY

According to one embodiment of this disclosure, a system for a vehicle is disclosed. The system may include an accumulator, a pump, and a controller. The controller may be configured to responsive to braking of the vehicle, close a line pressure regulator to isolate the accumulator and pump from a transmission pressure line demand, and operate the pump to charge the accumulator without satisfying any of the demand, and responsive to a tip-in event, open the line pressure regulator and operate the accumulator and pump to satisfy the demand.

According to another embodiment of this disclosure, a method of operating a vehicle is disclosed. The method may include closing a line pressure regulator to isolate an accumulator and a pump from a transmission line pressure demand in response to braking of a vehicle. The method may also include operating the pump to charge the accumulator without satisfying any of the demand and opening the line pressure regulator and operating the accumulator to satisfy the transmission line pressure demand in response to a tip-in event.

According to yet another embodiment of this disclosure, a vehicle is disclosed. The vehicle may include a controller that is configured to responsive to the vehicle traveling at a constant speed for a predetermined amount of time, close a line pressure regulator to isolate the accumulator and pump from a transmission pressure line demand, and operate the pump to charge the accumulator without satisfying any of the demand, and responsive to a tip-in event, open the line pressure regulator and operate the accumulator and pump to satisfy the demand.

BRIEF DESCRIPTION OF THE DRAWINGS

FIG. 3 is a graph illustrating the energy required to operate the pump while utilizing the accumulator and pump.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Current automatic transmissions have hydraulically actuated clutches and brakes for controlling the gearing using a hydraulic pump to pressurize and pump fluid to the control elements. Typically, the pump is driven directly by an engine via a mechanical coupling such as an input shaft. The pump may provide hydraulic fluid to various control elements and to an accumulator coupled to or within the automatic transmission. The accumulator may include a piston or diaphragm or bladder that is used to store hydraulic fluid and disperse hydraulic fluid through a series of pressure lines to actuate clutches and brakes to control the gearing within the automatic transmission.

Capturing kinetic energy dissipated when friction brakes are applied are well known. However, these methods often involve complex and expensive components. Kinetic energy may also be present and lost within an automatic transmission. Automatic transmissions may utilize pressurized hydraulic fluid to power the various hydraulic components within the transmission. It is advantageous to capture, store, and release this kinetic energy generated within an automatic transmission. As the vehicle is braking or decelerating, the vehicle generates kinetic energy. This kinetic energy may be captured by utilizing the kinetic energy to operate the pump and to provide pressurized hydraulic fluid to charge the accumulator. The energy stored within the accumulator, in the form of pressurized hydraulic fluid, may be used to hydraulically actuate clutches and brakes within the transmission during subsequent drive events. Upon discharging the accumulator, the pump may be modulated to meet the hydraulic requirements of the transmission.

Figure 1:
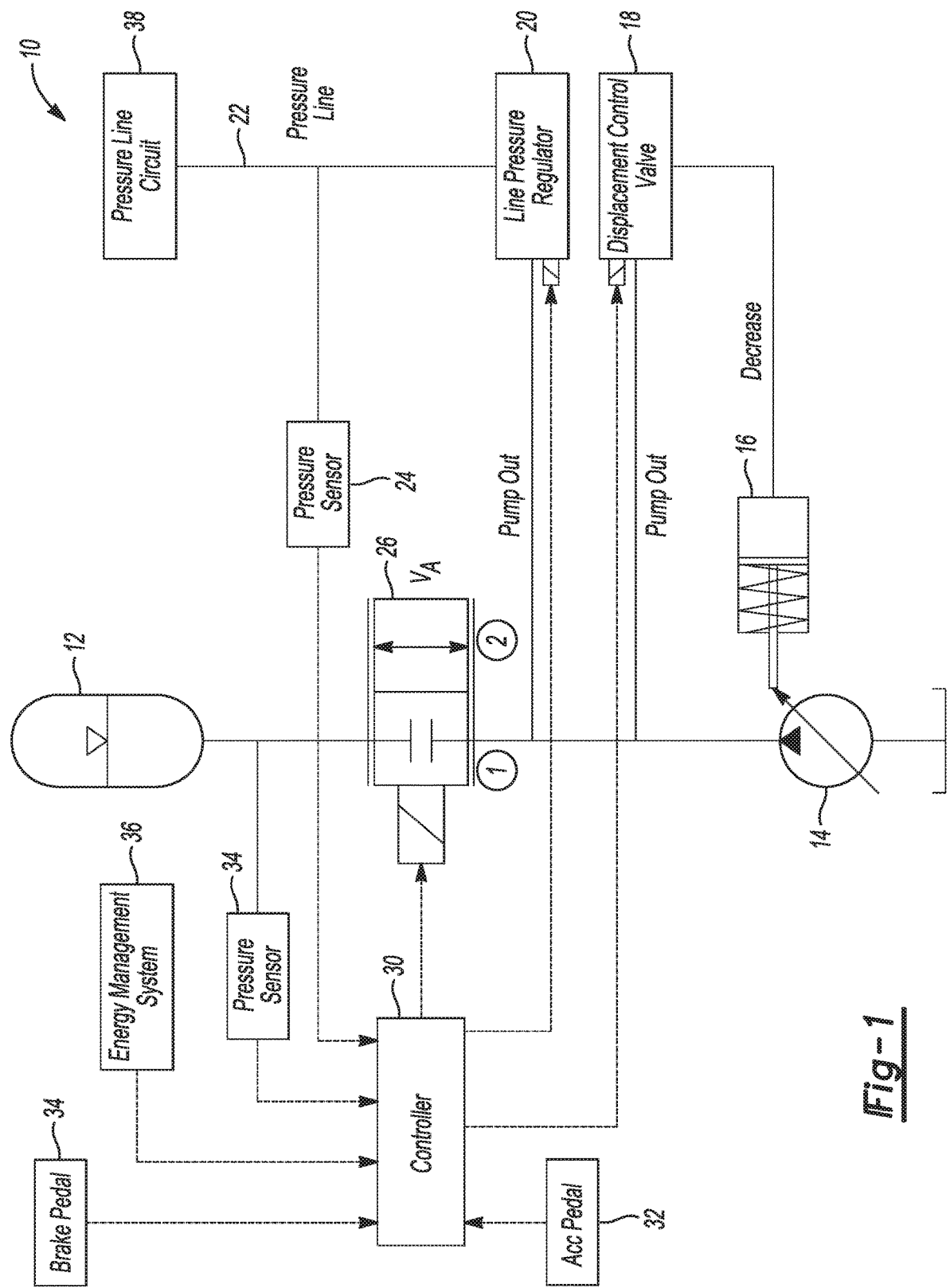
FIG. 1 is a schematic diagram of an example hydraulic circuit according to one embodiment of this disclosure.

Referring to FIG. 1, a schematic diagram of an example hydraulic circuit 10 utilized within an automatic transmission according to one embodiment of this disclosure is illustrated. The circuit 10 includes an accumulator 12 operatively coupled with a variable displacement pump 14. The accumulator 12 may include a piston and spring that may be actuated to store and disperse hydraulic fluid received by the pump 14. The size of the accumulator may range from twenty (20) to two-hundred (200) times the size of the pump. Meaning if the pump is sized of 0.025 liters per revolution, the accumulator may have the size between 0.5 L to 5.0 L. If the accumulator is too small, it would not be capable of capturing a sufficient quantity of kinetic energy generated during a braking event. If the accumulator is too large, the accumulator may be difficult to package within the transmission or vehicle.

The pump 14 is mechanically connected, directly or indirectly, to an input shaft coupled to an engine (not shown) and converts mechanical energy to hydraulic energy. The displacement or amount of fluid pumped per revolution of the input shaft may be varied while the pump is running. The displacement of the pump may be altered by the displacement changing mechanism 16. The altered flow may be may be actively controlled based on input from the controller 30 and independent of the line pressure. The displacement changing mechanism may include a spring and a piston or other suitable means to control the displacement of the pump. A displacement control valve 18 is hydraulically connected to the displacement changing mechanism 16 and the pump 14. The valve 18 may be opened or closed or disposed somewhere between the open and closed position to actively control of the displacement of the fluid through the pump.

It may be advantageous to increase or decrease the displacement of the pump depending on the operating status of the vehicle. For instance, if the vehicle is accelerating or driving at a relatively constant speed, for example within ±10 m.p.h., for a predetermined time, for example a time greater than 30 seconds, engine efficiency is relatively high. Because the efficiency of the engine is relatively high, it is advantageous to increase the displacement of the pump 14 by altering the status of the displacement changing mechanism 16. Contrastingly, if the engine is operating under a start-and-stop condition e.g., traffic, congestion, and etc., the engine may be operating at a lower efficiency and it may not be a time to operate the pump with an increased rate of displacement. While the engine is operating at a lower level of efficiency, it may be advantageous to provide pressurized hydraulic fluid from the accumulator 12 to the pressure line circuit 38. While the pressure line circuit 38 is represented by a black box, the pressure line circuit may include a plurality of pressure lines each connected to various control elements, e.g., brakes and clutches within the transmission.

A line pressure sensor 24 is disposed between the pressure line circuit 38 and the displacement control valve 18. The pressure sensor 24 may determine the pressure within the line 22 and provide a signal to the controller 30 that is indicative of the measured pressure. A valve 26 is hydraulically connected between the accumulator 12 and the pump 14. The valve 26 may have two positions of operation, position 1 and position 2. In position 1, the pump flow is disconnected from the accumulator and the fluid flow is sent to the pressure line circuit 38. In position 2, the pump flow is directed to charge the accumulator 12. The valve 26 may also be of proportional type, taking a position anywhere between position 1 and position 2.

The valve 26 may receive a signal from the controller 30 to alter the position of operation from position 1 to position 2 and vice-versa. An accumulator pressure sensor 28 may be disposed between the valve 26 and the accumulator 12. The accumulator pressure sensor 28 is configured to provide a signal to the controller 30 that is indicative of the capacity of the accumulator. If the accumulator has no capacity, the pressure of the accumulator 12 is at its highest point. If the accumulator has capacity, the pressure of the accumulator 12 will be less than the highest measured point.

A line pressure regulator 20 may be hydraulically connected between the valve 26 and the line pressure circuit 38. The line pressure regulator 20 may include an electrical actuator such as a solenoid or small motor that may actuate a valve to regulate the pressure within the pressure line 22. As the transmission line pressure demand changes the line pressure regulator 20 in turn changes. For instance, in response to an increase in line pressure demand, the line pressure regulator 20 may actuate to facilitate flow of pressurized fluid from the pump 14, accumulator 12, or both to the line pressure circuit 38. Moreover, the line pressure regulator may provide a signal to the controller 30 that is indicative of the increase in line pressure demand.

The controller 30 may be a plurality of controllers that communicate via a serial bus (e.g., Controller Area Network (CAN), FlexRay, Ethernet, etc.) or via dedicated electrical conduits. The controller generally includes any number of microprocessors, microcontrollers, ASICs, ICs, volatile (e.g., RAM, DRAM, SRAM, etc.) and non-volatile memory (e.g., FLASH, ROM, EPROM, EEPROM, MRAM, etc.) and software code to co-act with one another to perform a series of operations. The controller may also include predetermined data, or "look up tables" that are based on calculations and test data, and are stored within the memory. The controller may communicate with other vehicle systems and controllers over one or more wired or wireless vehicle connections using common bus protocols (e.g., CAN, LIN, Ethernet, etc.). Used herein, a reference to "a controller" refers to one or more controllers.

The controller 30 may also be configured to dynamically change the operative position of the valve 26 based on the conditions of the vehicle at a future point in time. For example, an energy management system 36 may be electrically coupled with the controller 30 such that the controller may alter the operation of the circuit 10 for various conditions.

A brake pedal 34 and an accelerator pedal 32 may be electrically connected to the controller 30. As the brake pedal 34 is pressed or applied by a driver, the controller may receive the signal that is indicative of the braking event and the controller 30 may send a signal to hydraulically charge the accumulator 12 or utilize the accumulator 12 to provide pressurized fluid to the pressure line circuit 38. As a "tip-in" event occurs, a signal is sent from the accelerator pedal 32 to the controller 30, that is indicative of occurrence of the tip-in event. In response to the tip-in event, the controller 30 may send a signal to that is indicative of the braking event and the controller 30 may send a signal to hydraulically charge the accumulator 12 or utilize the accumulator 12 to provide pressurized fluid to the pressure line circuit 38. Additionally, the controller 30 may receive a signal indicative of the amount the acceleration pedal 32 is pressed or has been depressed. For example, if the accelerator pedal is being depressed past a certain threshold and the vehicle is moving above a predetermined speed threshold, the displacement of the pump may be altered by the displacement changing mechanism 16. Because the engine operates most efficiently above a certain speed, it may be advantageous to operate the pump 14 at a high percentage of displacement (above 75%). As another example, if the controller 30 receives a signal indicative of a tip-in event, the controller 30 send a signal to provide pressurized fluid from the accumulator 12 to the pressure line circuit 38. Whether the accumulator 12 provides pressurized fluid from the accumulator 12 may depend on whether the accumulator 12 has sufficient capacity to satisfy the demand of the pressure line circuit 38.

Figure 2:
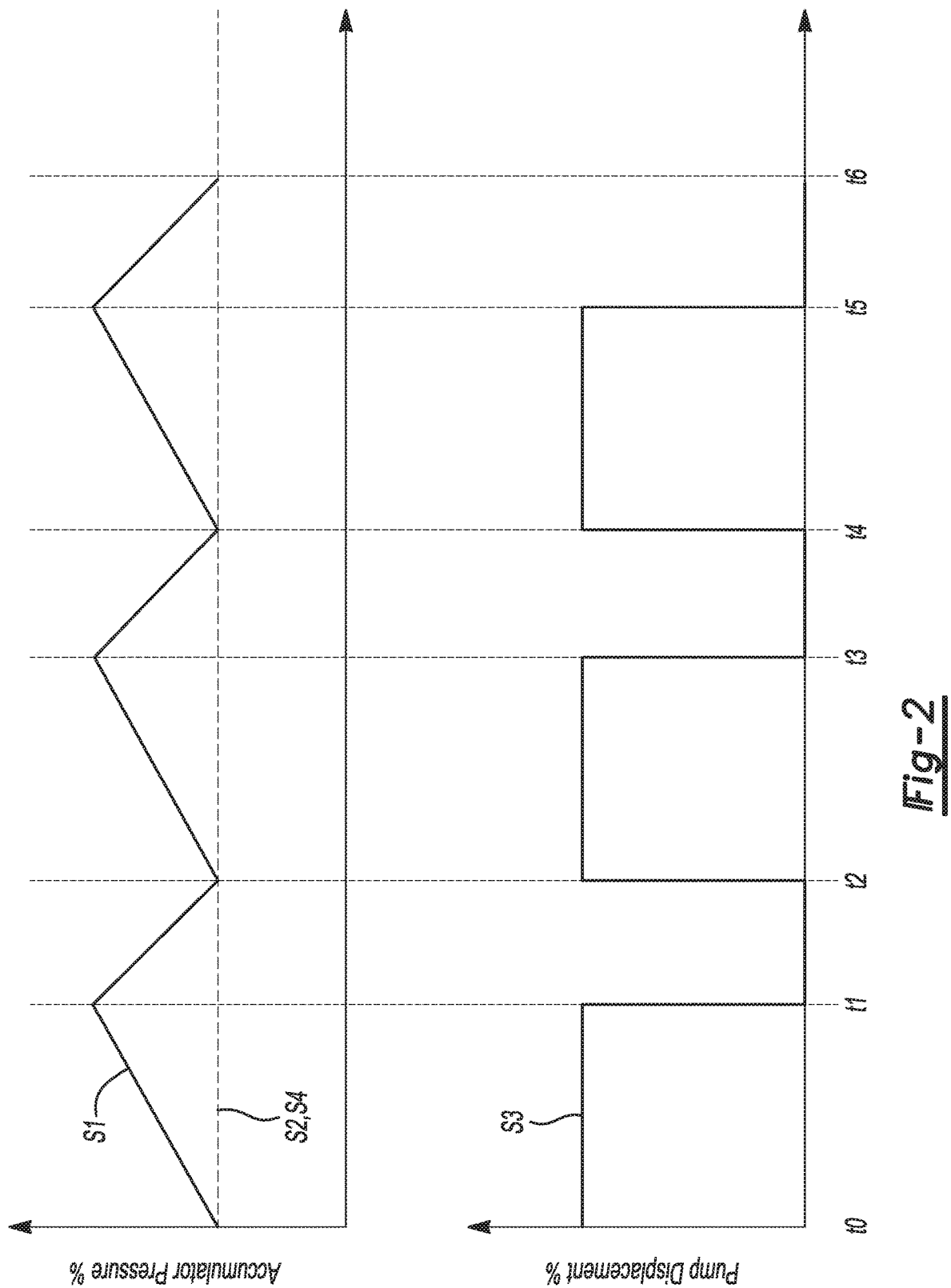
FIG. 2 is a graph showing the operating states of the accumulator and pump.

Referring to FIG. 2, a graph illustrating the status of hydraulic components, and pump displacement and pressure characteristics of the hydraulic components during a driving and braking event. The top graph is representative of the accumulator pressure (psi) and the demanded and actual transmission line pressure over time. Line 51 represents the accumulator pressure, line S2 represents the demanded transmission line pressure of the pressure line circuit 38. Line S4 represents the actual pressure of the pressure line circuit 38. The mean actual pressure of the pressure line circuit 38 closely tracks the demanded transmission line pressure. Line S3 in the bottom graph represents the pump displacement as a percentage.

At t0 the accumulator capacity is below a threshold associated with a road grade and engine efficiency. The displacement of the pump is commanded to or near 100% to charge the accumulator. At t1 the accumulator capacity threshold has been met and the pressurized fluid stored within the accumulator is used to satisfy the transmission line pressure demand. At t2, the accumulator is discharged and the displacement of the pump is commanded to or near 100% to again charge the accumulator.

Referring to FIG. 3, a graph illustrating the amount of energy required to run the pump during non-braking events and during braking events and the amount of energy recovered during the braking event. Line S6 represents the pump energy required during braking events. Line S7 represents the energy required during non-braking events, including but not limited to, driving at a constant speed or coasting when a braking event is imminent. Line S8 represents energy required by the pump currently for braking and non-braking events. Line S9 represents energy that is recovered during braking events. Line S10 represents the total pump energy or the summation of line S8 and line S9. The difference between the line S8 and line S9 indicates the amount of energy to be provided by the pump in addition to that recovered from the pump. Line S9 also represents the energy saved in terms of fuel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle comprising:
   an accumulator;
   a pump; and
   a controller configured to
      responsive to braking of the vehicle, close a line pressure regulator to isolate the accumulator and pump from a transmission pressure line demand, and operate the pump to charge the accumulator without satisfying any of the demand,
      responsive to a tip-in event, open the line pressure regulator and operate the accumulator and pump to satisfy the demand,
      responsive to a capacity of the accumulator falling below a threshold, open the line pressure regulator and operate the pump only to satisfy the demand, and
      operate a valve fluidly connected to the pump, the line pressure regulator, and accumulator to prevent flow from the pump to the accumulator and to facilitate a flow of fluid from the pump to the line pressure regulator to satisfy the demand.

2. The system of claim 1, wherein the controller is further configured to operate a valve fluidly connected to the pump, the line pressure regulator, and the accumulator to facilitate flow of fluid from the accumulator and the pump to satisfy the demand.

3. The system of claim 1, wherein the controller is further configured to, responsive to the tip-in event, open the line pressure regulator and operate the accumulator to satisfy the demand.

4. The system of claim 3, wherein the controller is further configured to operate a valve fluidly connected to the pump, the line pressure regulator, and accumulator to prevent flow from the pump to the line pressure regulator and to facilitate a flow of fluid from the pump to the accumulator to hydraulically charge the accumulator.

5. The system of claim 1, wherein the pump is a variable displacement pump and the controller is further configured to, responsive to the tip-in event, change a displacement of the variable displacement pump and wherein the change is inversely proportional to an amount of fluid provided by the accumulator.

6. A method of operating a vehicle comprising:
   by a controller,
      closing a line pressure regulator to isolate an accumulator and a pump from a transmission line pressure demand in response to braking of the vehicle;
      operating the pump to charge the accumulator without satisfying any of the demand; and
      opening the line pressure regulator and operating the accumulator to satisfy the demand in response to a tip-in event;
      opening the line pressure regulator and operating the pump only to satisfy the demand; and
      operating a valve fluidly connected to the pump, the line pressure regulator, and accumulator to prevent flow from the pump to the accumulator to facilitate a flow of fluid from the pump to the line pressure regulator to satisfy the demand.

7. The method of claim 6, further comprising operating a valve fluidly connected to the pump, the line pressure regulator, and the accumulator to facilitate flow of fluid from the accumulator and the pump to satisfy the demand.

8. The method of claim 6, further comprising opening the line pressure regulator and operating the accumulator only to satisfy the demand.

9. The method of claim of claim 6, further comprising operating a valve fluidly connected to the pump, the line pressure regulator, and accumulator to prevent flow from the pump to the line pressure regulator and to facilitate a flow of fluid from the pump to the accumulator to hydraulically charge the accumulator.

10. The method of claim 6, further comprising adjusting a displacement of the pump, wherein a change in the displacement corresponding to the displacement is inversely proportional to an amount of fluid provided by the accumulator.

* * * * *